Dec. 16, 1930.  W. J. McLACHLAN  1,785,712
SYSTEM OF ELECTRIC DISTRIBUTION
Filed April 13, 1929   2 Sheets-Sheet 2
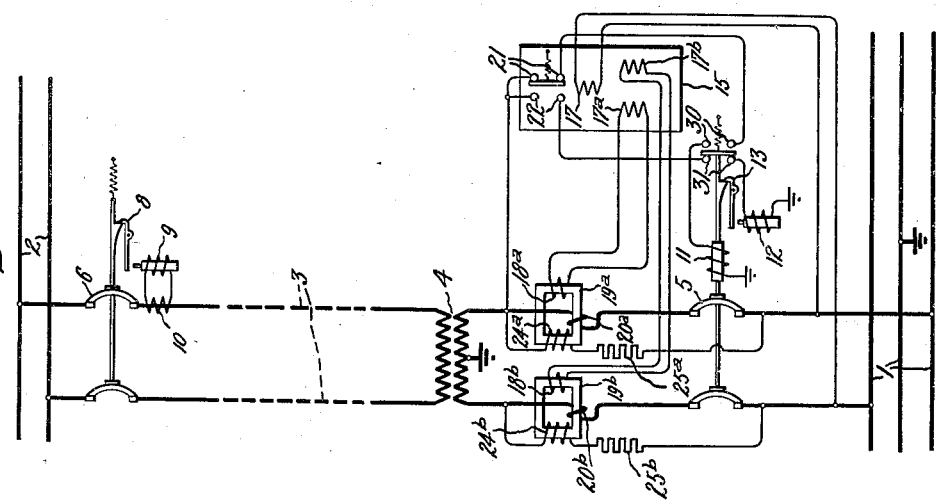
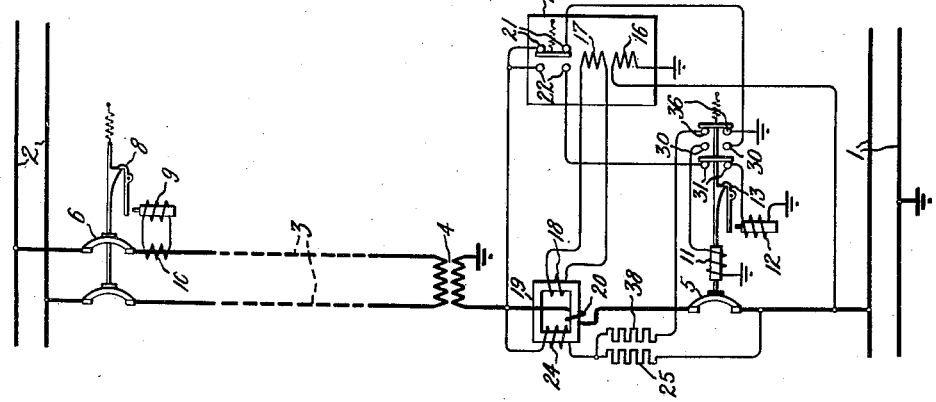
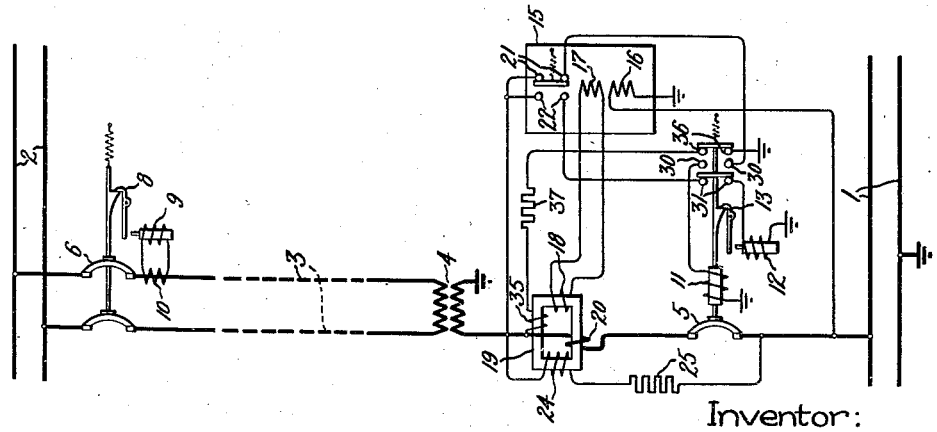
Inventor:
Willard J. McLachlan,
by Charles E. Mullen
His Attorney.

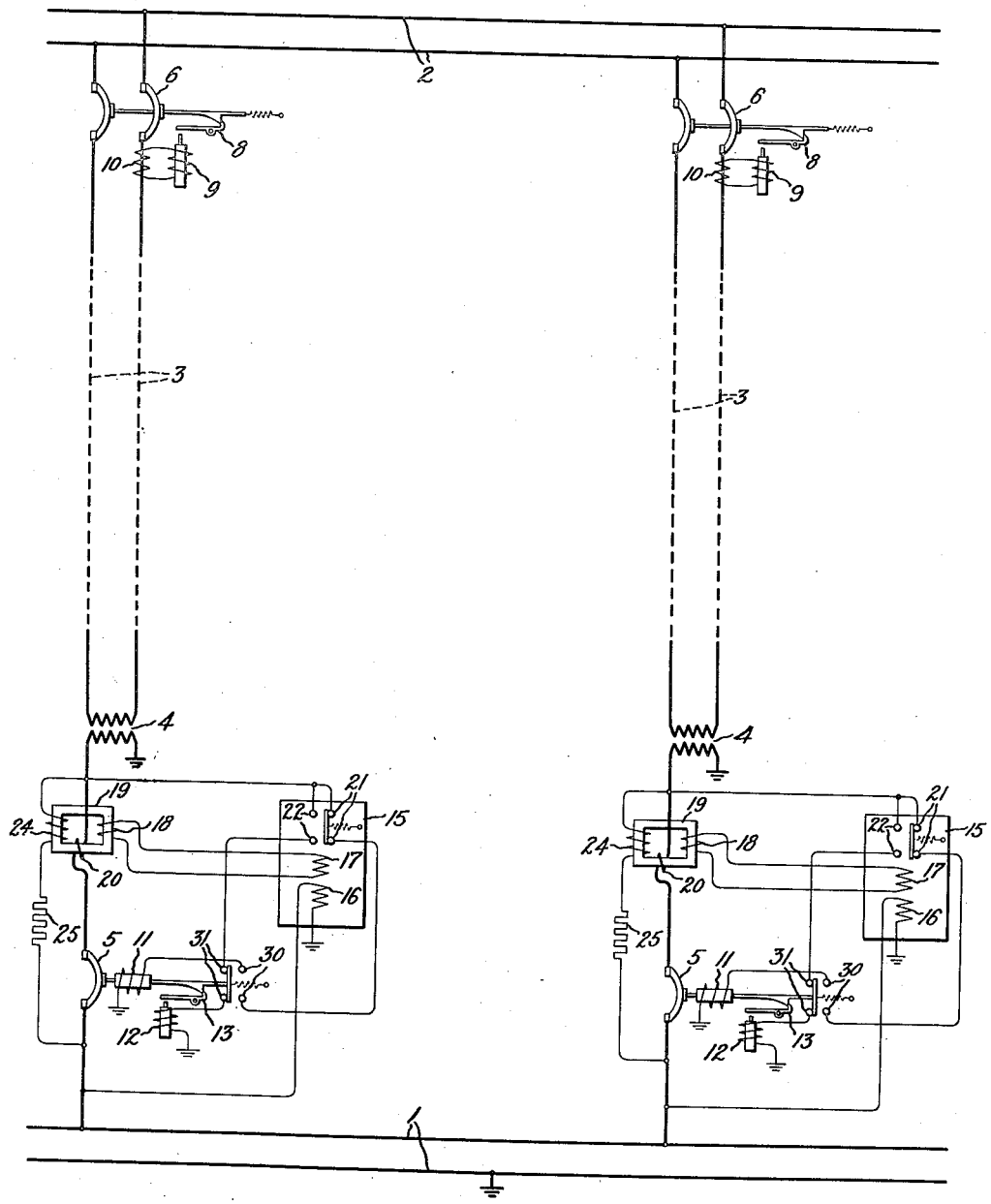

Patented Dec. 16, 1930

1,785,712

UNITED STATES PATENT OFFICE

WILLARD J. McLACHLAN, OF SCHENECTADY, NEW YORK, ASSIGNOR TO GENERAL ELECTRIC COMPANY, A CORPORATION OF NEW YORK

SYSTEM OF ELECTRIC DISTRIBUTION

Application filed April 13, 1929. Serial No. 354,962.

My invention relates to systems of electric distribution and particularly to alternating current networks which are supplied with current at a plurality of points by means of feeder circuits fed from the same or different sources of current. In such network systems it is desirable to be able to disconnect a feeder from the network whenever a fault occurs on the feeder or the feeder is disconnected from its source of current and to reconnect the feeder to the network automatically when the feeder is reenergized.

One object of my invention is to provide an improved arrangement for automatically effecting the disconnection of a feeder from a network when a reversal of energy flow occurs through the feeder and for reconnecting the feeder to the network when normal conditions have been restored in the feeder.

For the purpose of explaining the present invention it has been illustrated in the accompanying drawings as applied to an alternating current distribution system with an interconnected secondary system but it will be understood that it may be applied to other systems of electric distribution and in general to two interconnected alternating current circuits which are subject to a reversal of energy flow between them.

My invention will be better understood from the following description taken in connection with the accompanying drawings and its scope will be pointed out in the appended claims.

In the drawings Fig. 1 diagrammatically shows an alternating current distribution system embodying my invention and Figs. 2, 3 and 4 are modifications of the control arrangement shown in Fig. 1.

Referring to Fig. 1, 1 is a single-phase network which is arranged to be supplied with electric energy from a suitable supply circuit 2 by means of a plurality of feeder circuits 3, two of which are shown in the drawing.

Each feeder circuit 3 includes a step-down transformer 4, the low voltage secondary winding of which is arranged to be connected to the network by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit 3 by means of a current transformer 10. Any suitable means, either manually or automatically controlled, may be provided for closing the circuit breakers 6.

The circuit breakers 5 may also be of any suitable type, examples of which are well known in the art. As shown in the drawing, each circuit breaker 5 is of the well known latched-in type and includes a closing coil 11 which, when energized, closes the circuit breaker and a trip coil 12 which when energized releases a latch 13 which holds the circuit breaker in its closed position.

In order to effect the opening of a secondary circuit breaker 5 when a fault occurs in the associated transformer 4 or feeder circuit 3 or the associated primary circuit breaker 6 is opened, each secondary circuit breaker 5 has associated therewith a power directional relay 15 which is arranged to effect the energization of the trip coil 12 of the circuit breaker when a predetermined small amount of reverse power flows from the network to the associated feeder circuit. The power directional relays 15 may be of any suitable type examples of which are well known in the art. As shown, each power directional relay 15 includes a potential winding 16 which is permanently connected across the network 1 and a current coil 17 which is permanently connected across the secondary winding 18 of a current transformer 19 the primary winding 20 of which is connected in series relation with the secondary winding of the associated power transformer 4 and the network 1 when the associated circuit breaker 5 is closed. Each power directional relay 15 is arranged so that normally it maintains closed its contacts 21 which are in an energizing circuit for the closing coil 11 of the associated circuit breaker 5. When, however, more than a predetermined small amount of reverse power flows from the network 1 to a feeder circuit 3, the associated power directional relay 15 is arranged to open its contacts 21 and closes its contacts 22 which are in an energizing circuit for the trip coil 12 of the associated circuit breaker 5.

In order that each power directional relay 15 may also control the reclosing of the associated circuit breaker 5 in response to the relative phases and magnitudes of the respective power transformer secondary and the network voltages, in accordance with my invention, I provide each current transformer 19 with a tertiary winding 24 which is connected in any suitable manner so that it is energized in accordance with the difference between the respective power transformer secondary voltage and the network voltage when the circuit breaker 5 is opened. As shown in the drawing, each winding 24 is connected in a shunt circuit across the terminals of the respective circuit breaker 5. Preferably a suitable current limiting device such as a resistor 25 is connected in series with each transformer winding 24.

With my improved arrangement it will be observed that each winding 24 when its respective circuit breaker 5 is open causes a current to flow through the current winding 17 of the respective power directional relay 15 which varies in accordance with the relative phases and magnitudes of the respective power transformer secondary and network voltages.

The operation of the arrangement shown in Fig. 1 is as follows: Let it be assumed that the circuit breakers 5 and 6 in one of the feeders are closed and that the circuit breakers 5 and 6 in the other feeder are open. Under these conditions, the voltage windings 16 of both power directional relays 15 are energized in response to the network voltage and the current winding 17 of the relay 15 associated with the closed circuit breaker 5 is energized in response to the current being supplied to the network through the closed circuit breaker 5. Therefore, this relay 15 maintains its contacts 21 closed and its contacts 22 open. Since the winding 24 and resistor 25 associated with the closed circuit breaker 5 are short-circuited, substantially all of the current that flows through the closed circuit breaker flows through the primary winding 20 of the current transformer 19 associated with the closer circuit breaker 5.

The power directional relay 15 associated with the open circuit breaker 5, however, maintains its contacts 21 open and its contacts 22 closed since the circuit of the winding 20 of its respective current transformer 19 is open and the winding 24 thereof is energized by the small reverse current supplied therethrough to the secondary winding of the deenergized power transformer 4.

When the open circuit breaker 6 is closed so that the transformer 4 which is connected thereto is energized from the supply circuit 2 and when the secondary voltage of this transformer bears a predetermined relation to the network voltage such for example as when it is slightly greater and substantially in phase with the network voltage the current in the winding 24 of the current transformer 19 associated with the open circuit breaker 5 induces in the secondary winding 18 of the current transformer 19 a voltage of the proper phase to cause the power directional relay 15 associated therewith to close its contacts 21. The closing of these contacts 21 connects the closing coil 11 and the auxiliary contact 30 of the open circuit breaker 5 across the secondary of the power transformer 4 so that the open circuit breaker is closed to reconnect the transformer secondary to the network. When the circuit breaker 5 closes the opening of its auxiliary contacts 30 deenergizes the closing coil 11 but the circuit breaker is held in its closed position by the latch 13 after the closing coil 11 is deenergized.

When the circuit breaker 6 is closed and power flows from the supply circuit 2 to the network the current produced in the current winding 17 of the power directional relay 15 by the current flowing through the winding 20 of the respective current transformer 19 has the proper phase relation with respect to the current in the voltage winding 16 of the relay to produce a torque in the proper direction to maintain the relay contact 21 closed. Therefore, as long as power flows through a circuit breaker from the supply circuit 2 to the network 1, the respective circuit breaker 5 remains closed.

When a primary circuit breaker 6 is opened or a fault occurs on a feeder 3 so that reverse power flows through the respective secondary circuit breaker 5 the reverse current through the primary winding 20 of the current transformer 19 in the respective feeder causes the phase of the current in the current winding 17 of the relay 15 associated with the feeder to change in such a manner with respect to the current in the voltage winding 16 of the relay that the torque of the relay is reversed and the relay opens its contacts 21 and closes its contacts 22. The closing of the contacts 22 connects the trip coil 12 and the auxiliary contacts 31 of the circuit breaker 5 in series across the secondary of the power transformer 4 so that the circuit breaker 5 opens and disconnects the power transformer secondary from the network 1.

After the circuit breaker 5 has opened, it can be reclosed again automatically in the manner above described when the magnitude and phase of the transformer secondary voltage bears a predetermined relation to the magnitude and phase of the network voltage.

In some cases it is desirable to have the power directional relay 15 arranged so that it has a relatively high reverse power setting under normal voltage conditions and a reverse power setting which decreases as the feeder voltage decreases. In the modification of Fig. 1 shown in Fig. 2, I accomplish this result by adding a fourth winding 35 to each current transformer 19 and providing the respective circuit breaker 5 with the auxiliary contacts 36 whereby the respective windings 35 are arranged to be energized in response to the secondary voltage of the respective power transformers 4 when they are connected to the network. In order to limit the current through the winding 35 the resistance of its circuit is made relatively high, preferably by means of a resistor 37 connected in series therewith.

The use of a voltage winding 35 on a current transformer to obtain the desired reverse power setting of a power directional relay forms the subject matter of a copending application of D. K. Blake, Serial No. 348,337, which is assigned to the same assignee as this application.

In the modification shown in Fig. 3, I accomplish the result which the winding 35 in Fig. 2 accomplishes by connecting the auxiliary contacts 36 on each circuit breaker 5 so that the winding 24 of the respective transformer 19 and a suitable current limiting device such as a resistor 38 are connected in series across the secondary of the respective power transformer 4 when the switch 5 is closed. In this modification each transformer winding 24, therefore, operates to control the opening operation of the respective relay 15 as well as the reclosing operation thereof.

The modification shown in Fig. 4 is similar to the control arrangement shown in Fig. 1 for each feeder except that I have shown an arrangement for a double pole secondary circuit breaker 5. In this modification the power directional relay is provided with two current coils 17a and 17b which are respectively connected across the secondary windings 18a and 18b of two current transformers 19a and 19b, the primary windings 20a and 20b of which are connected in series with different poles of the circuit breakers. The tertiary windings 24a and 24b of the current transformers 19a and 19b are connected across the terminals of the respective poles of the circuit breaker and have in series therewith the resistors 25a and 25b respectively.

The operation of the modification shown in Fig. 4 will be obvious to one skilled in the art from the heretofore description of the arrangement shown in Fig. 1.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit, a circuit breaker in said circuit, a current transformer having a primary winding connected in series with said circuit and a secondary winding, a relay for controlling the operation of said circuit breaker having a winding connected to the secondary winding of said transformer, and a tertiary winding on the core member of said current transformer connected across the terminals of said circuit breaker.

2. In combination, an alternating current supply circuit, an alternating current load circuit, a circuit breaker interconnecting said circuits, a current transformer having a primary winding energized in response to the current through said circuit breaker and a secondary winding, a power directional relay for controlling the opening and closing of said circuit breaker including a winding connected across the secondary winding of said transformer, and a tertiary winding on the core of said current transformer energized in response to the relative voltages of said circuits when said circuit breaker is open.

3. In combination, an alternating current supply circuit, an alternating current load circuit, a circuit breaker interconnecting said circuits, a current transformer having a primary winding energized in response to the current through said circuit breaker and a secondary winding, a power directional relay for controlling the opening and closing of said circuit breaker including a winding connected across the secondary winding of said transformer and a winding responsive to the voltage of said network and a tertiary winding on said current transformer connected in series with said circuits when said circuit breaker is open.

4. In combination, an alternating current supply circuit, an alternating current load circuit, a circuit breaker interconnecting said circuits, a current transformer having a primary winding energized in response to the current through said circuit breaker and a secondary winding, a power directional relay for controlling the opening and closing of said circuit breaker including a winding connected across the secondary winding of said transformer, and means for exciting said current transformer in response to the voltage of one of said circuits when said circuit breaker is closed and in response to the relative voltages of said circuits when said circuit breaker is open.

5. In combination, an alternating current supply circuit, a network, a power transformer having its primary winding connected to said supply circuit and its secondary winding connected to said network, a circuit breaker between said transformer secondary and said network, a current transformer having a primary winding connected in series relation between said power transformer secondary and network when said circuit breaker is closed and a secondary winding, a power directional relay for controlling the opening and closing of said circuit breaker including a voltage winding energized in response to the network voltage and a current winding connected across the secondary winding of said current transformer, and a tertiary winding on the core of said current transformer energized in response to the relative phases and magnitudes of the power transformer secondary and the network voltages when said circuit breaker is open.

6. In combination, an alternating current supply circuit, a network, a power transformer having its primary winding connected to said supply circuit and its secondary winding connected to said network, a circuit breaker between said transformer secondary and said network, a current transformer having a primary winding connected in series relation between said power transformer secondary and network when said circuit breaker is closed and a secondary winding, a power directional relay for controlling the opening and closing of said circuit breaker including a voltage winding energized in response to the network voltage and a current winding connected across the secondary winding of said current transformer, and a tertiary winding on said current transformer connected in a shunt circuit around said circuit breaker.

7. In combination, an alternating current supply circuit, a network, a power transformer having its primary winding connected to said supply circuit and its secondary winding connected to said network, a circuit breaker between said transformer secondary and said network, a current transformer having a primary winding connected in series relation between said power transformer secondary and network when said circuit breaker is closed and a secondary winding, a power directional relay for controlling the opening and closing of said circuit breaker including a voltage winding energized in response to the network voltage and a current winding connected across the secondary winding of said current transformer, a tertiary winding on said current transformer permanently connected across the terminals of said circuit breaker, an impedance, and means controlled by said circuit breaker for connecting said impedance and tertiary winding across said power transformer secondary winding when said cricuit breaker is closed.

8. In combination, an alternating current supply circuit, a network, a power transformer having its primary winding connected to said supply circuit and its secondary winding connected to said network, a circuit breaker between said transformer secondary and said network, a current transformer having a primary winding connected in series relation between said power transformer secondary and network when said circuit breaker is closed and a secondary winding, a power directional relay for controlling the opening and closing of said circuit breaker including a voltage winding energized in response to the network voltage and a current winding connected across the secondary winding of said current transformer, a tertiary winding on said current transformer, a means for energizing said tertiary winding in response to the power transformer secondary voltage when said circuit breaker is closed.

In witness whereof, I have hereunto set my hand this 12th day of April, 1929.

WILLARD J. McLACHLAN.